United States Patent [19]

Kanazawa et al.

[11] Patent Number: 5,464,252
[45] Date of Patent: Nov. 7, 1995

[54] ANCHOR DEVICE FOR SEAT BELT

[75] Inventors: Yoshinobu Kanazawa; Hidetsugu Okazaki, both of Wako, Japan

[73] Assignee: Honda Giken Kogyo Kabushiki Kaisha, Tokyo, Japan

[21] Appl. No.: 196,840

[22] Filed: Feb. 15, 1994

[30] Foreign Application Priority Data

Feb. 17, 1993 [JP] Japan ..................... 5-027956

[51] Int. Cl.⁶ .................................. B60R 22/28
[52] U.S. Cl. ..................... 280/805; 188/371; 297/472
[58] Field of Search ................. 280/801.1, 801.2, 280/805, 808; 188/371, 375, 376; 297/470, 471, 472

[56] References Cited

U.S. PATENT DOCUMENTS

| | | | |
|---|---|---|---|
| 3,438,674 | 4/1969 | Radke et al. | 280/805 |
| 3,482,872 | 12/1969 | Chamberlain | 297/472 |
| 3,811,702 | 5/1974 | Kurasawa et al. | 280/805 |
| 3,938,627 | 2/1976 | Nagazumi | 188/371 |
| 4,027,905 | 6/1977 | Shimogawa | 188/371 |

FOREIGN PATENT DOCUMENTS

| | | |
|---|---|---|
| 1877850 | 5/1961 | Germany . |
| 2218910 | 10/1973 | Germany .................. 280/805 |
| 1-114465 | 8/1989 | Japan . |
| 2-13247 | 4/1990 | Japan . |
| 3-104464 | 10/1991 | Japan . |
| 1081612 | 3/1964 | United Kingdom . |
| 1359785 | 6/1972 | United Kingdom . |
| 2240028 | 10/1989 | United Kingdom . |
| 2265813 | 4/1992 | United Kingdom . |

*Primary Examiner*—Margaret A. Focarino
*Assistant Examiner*—Paul N. Dickson
*Attorney, Agent, or Firm*—Armstrong, Westerman, Hattori, McLeland and Naughton

[57] ABSTRACT

An anchor device for a seat belt for connecting, to a vehicle, a webbing for restraining an occupant to a seat so that a load applied to the webbing is received by the vehicle body. The anchor device includes a frame on which an anchor for locking the webbing is supported, a shock absorbing member which is secured at one end to the frame and at the other end to the vehicle body and which is capable of being deformed by a load applied to the frame, and a coupling member for coupling a portion of the shock absorbing member near the other end to the frame. The coupling member is broken or deformed by the load applied to the frame to separate the frame and the shock absorbing member from each other. Thus, when a load is applied from the webbing to the anchor of the seat belt, the anchor is moved properly to absorb the shock.

7 Claims, 11 Drawing Sheets

ANCHOR DEVICE FOR SEAT BELT

BACKGROUND OF THE INVENTION

1. Field of the Invention

The present invention relates to an anchor device for a seat belt for connecting a webbing to a vehicle body for restraining an occupant to a seat so that a load applied to the webbing is received by the vehicle body.

2. Description of the Prior Art

There are seat belt systems for restraining an occupant by a webbing upon collision of a vehicle, which include means for absorbing a shock by slightly moving or stretching the webbing in a direction in which a load is applied. Such seat belt systems have been proposed in Japanese Utility Model Application Laid-open No. 104464/91, Japanese Utility Model Publication No. 13247/90 and Japanese Utility Model Application Laid-open No. 114465/89.

The seat belt system described in Japanese Utility Model Application Laid-open No. 104464/91 is made by overlapping and sewing a loose portion formed in a portion of the webbing. In this seat belt system, the sewn portion is broken by a shock to stretch the webbing, thereby exhibiting a shock absorbing effect.

In the seat belt system described in Japanese Utility Model Publication No. 13247/90, a bead-like bent portion is formed on a floor panel of a vehicle body, to which an anchor for locking the webbing is fixed. In this system, the bead-like bent portion is stretched by a shock to move the webbing, thereby exhibiting a shock absorbing effect.

In the seat belt system described in Japanese Utility Model Application Laid-open No. 114465/89, a loop-like opening is defined in an anchor to intersect, at right angle a direction of extension of the webbing. In this system, the opening is deformed by a shock to move the webbings thereby exhibiting a shock absorbing effect.

To cause such seat belt systems to exhibit an effective shock absorbing effect, it is necessary to properly set the magnitude of a load, in the moment when the movement of the webbing is started, and to properly set the amount of movement of the webbing and the load of such movement. However, any of the prior art seat belt system suffers from a problem that such setting is difficult.

SUMMARY OF THE INVENTION

Accordingly, it is an object of the present invention to provide an anchor device, for a seat belt, in which the load in the moment when the movement of the webbing is started, as well as the amount of movement of the webbing and the load of such movement, can be set easily and properly.

To achieve the above object, according to a first aspect and feature of the present invention, there is provided an anchor device for a seat belt, for connecting, to a vehicle body, a webbing for restraining an occupant to a seat so that a load applied to the webbing is received by the vehicle body. The anchor device comprises a frame on which an anchor for locking the webbing is supported, a shock absorbing member secured at one end thereof to the frame and at the other end to the vehicle body and which is capable of being deformed by a load above a predetermined level applied to the frame, and a coupling member for coupling a portion of the shock absorbing member, near the other end thereof, to the frame, the coupling member being broken or deformed by the load applied to the frame so as to separate the frame and the shock absorbing member from each other.

With the above construction, if the load of a shock produced, due to the collision of a vehicle, is transmitted from the webbing through the anchor to the frame, the coupling member, coupling the frame and the shock absorbing member to each other, is broken or deformed by such load, so that the frame is moved along with the anchor and the webbing, while deforming the shock absorbing member. During this time, the load of the shock is effectively absorbed by the deformation of the shock absorbing member. The magnitude of the load in the moment when the shock absorbing member is deformed and the movement of the webbing is started can be set at any value by changing the strength of the coupling member. Further, the amount of movement of the webbing, and the load of such movement, can be set at any values by changing the length and strength of the shock absorbing member.

According to a second aspect and feature of the present invention, there is provided an anchor device for a seat belt, comprising a webbing for restraining an occupant to a seat fixed to a vehicle body, a frame to which the webbing is connected, a coupling means to restrain the relative position of the frame with respect to the vehicle body and to permit a relative movement of the frame with respect to the vehicle body in response to a load applied to the frame, and a shock absorbing means, interposed between the frame and the vehicle body, to exhibit a resisting force in a direction to inhibit the relative movement.

With the above construction, if the load of a shock, produced due to the collision of a vehicle, is applied through the webbing to the frame, whose relative position with respect to the vehicle body is restrained by the coupling means, the frame is moved relative to the vehicle body in response to the load. During this time, the shock absorbing means exhibits the resisting force, so that the load of the shock is absorbed effectively. The magnitude of the load in the moment when the relative movement is permitted to be started by the coupling member and the resisting force of the shock absorbing means can be set at any values, respectively.

According to a third aspect and feature of the present invention, there is provided an anchor device for a seat belt, comprising a webbing for restraining an occupant to a seat fixed to a vehicle body, an anchor for locking the webbing, a shock absorbing means, which connects the anchor to the vehicle body and which is deformed by a load applied to the anchor, so as to permit a relative movement of the anchor with respect to the vehicle body, a frame for restraining the deformation, and a coupling means interposed between the frame and the shock absorbing means so as to release the restraint by the load applied to the anchor.

With the above construction, if the load of the shock produced, due to the collision of the vehicle, is applied through the webbing to the anchor, the coupling means releases the restraint provided by the frame and, hence, the anchor is moved relative to the vehicle body, while deforming the shock absorbing means. During this time, the load of the shock is absorbed effectively by the deformation of the shock absorbing means. The load for the coupling means to release the restraint, and the load and the shock absorbing force required to deform the shock absorbing means, can be set at any values, respectively.

The above and other objects, features and advantages of the invention will become apparent from the following description of preferred embodiments, taken in conjunction with the accompanying drawings.

DESCRIPTION OF THE PREFERRED EMBODIMENTS

A first embodiment of the present invention will now be described in connection with FIGS. 1 to 6.

Figure 1:
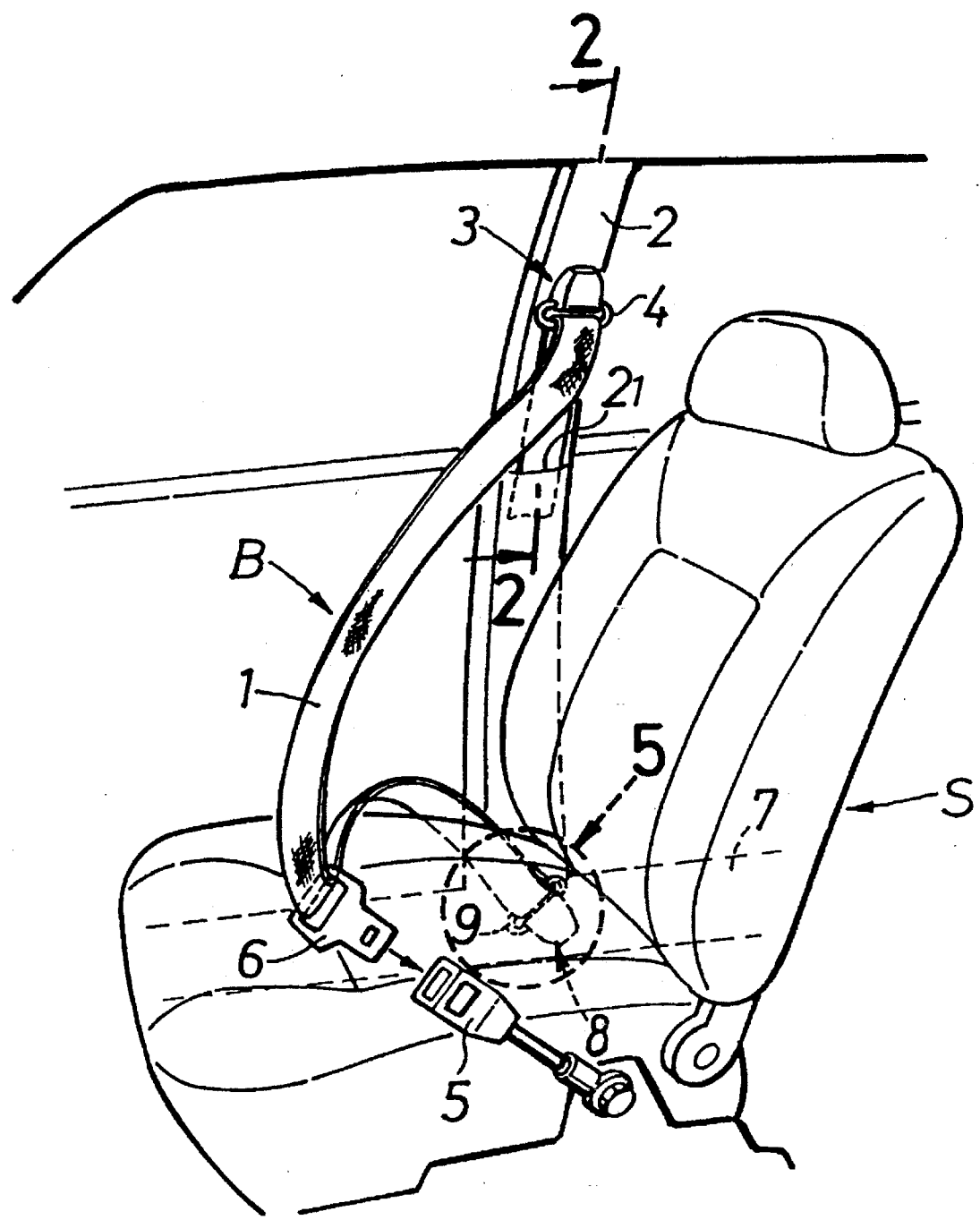
FIG. 1 is a perspective view of a seat belt provided with an anchor device according to a first embodiment of the present invention.

FIG. 1 illustrates a seat belt B provided over a right side seat S. A webbing 1 restrains an occupant upon collision of an automobile. One end of the webbing 1 is wound into a retractor (not shown) mounted at a base end of a center pillar 2, and is drawn into a compartment, through an opening $2_1$, defined in an interior of the center pillar 2 at a vertically intermediate portion of center pillar 2. The webbing 1 is passed through a shoulder anchor 4, of a shoulder anchor device 3, mounted at an upper portion of the center pillar 2 and through a tongue plate 6, detachably locked to a buckle 5 on a left side of a lower portion of the seat S. The other end of the webbing 1 is fixed to a wrap anchor 9 of a wrap anchor device 8 mounted on a side sill 7, FIGS. 1, 5 and 6.

Figure 2:
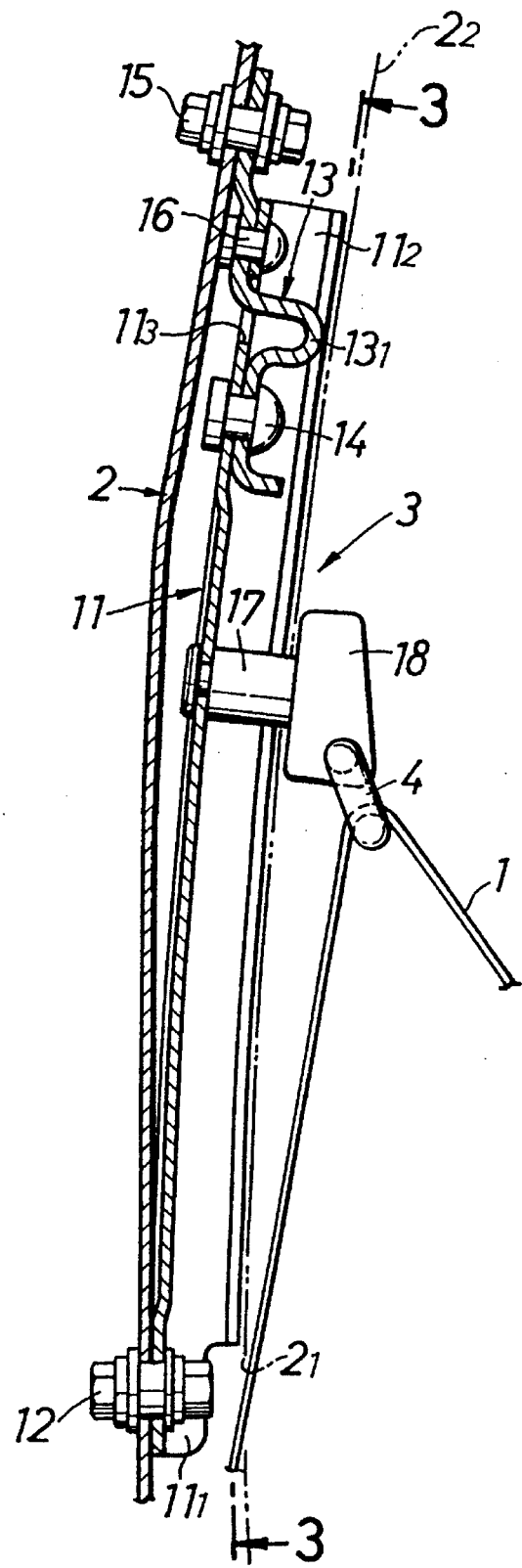
FIG. 2 is a sectional view taken along line 2—2 in FIG. 1.
Figure 3:
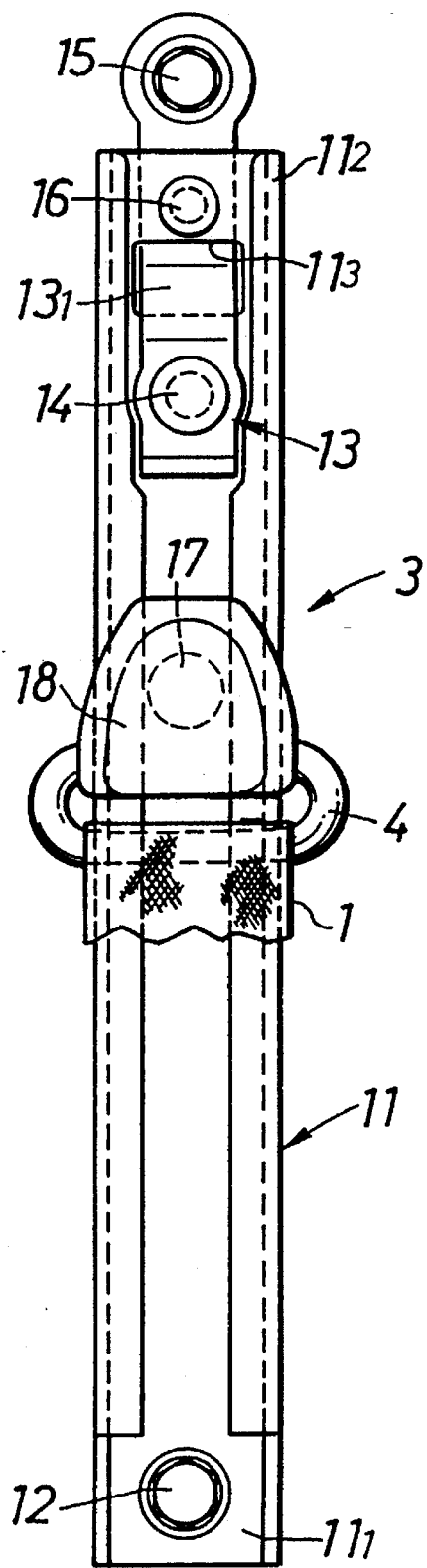
FIG. 3 is a sectional view taken along line 3—3 in FIG. 2.

As shown in FIGS. 2 and 3, the shoulder anchor device 3, mounted on the center pillar 2, includes an anchor frame 11 having a U-shaped section and is secured, by bolt 12, to the center pillar 2 in the vicinity of a fixing anchor frame end $11_1$ of a lower portion of the anchor frame 11. A shock absorbing member 13, made by bending a band-like metal plate, is coupled at one end thereof to an upper portion of the anchor frame 11, near its free anchor frame end $11_2$, by a rivet 14 having a relatively large diameter. The shock absorbing member 13 extends outwardly from the inside through an anchor frame opening $11_3$, FIG. 3, defined in the vicinity of the free anchor frame end $11_2$ of anchor frame 11. The other end of the shock absorbing member 13 is secured to the center pillar 2 by a bolt 15. A portion of the shock absorbing member 13, near the other end, is superposed on and coupled to an outer surface of the free anchor frame end $11_2$ of anchor frame 11 by a rivet 16 serving as a coupling member having a relatively small diameter. The shock absorbing member 13 is formed with a U-shaped bent portion $13_1$ between rivets 14 and 16. A support member 17 of shoulder anchor 4 is secured to an intermediate portion of anchor frame 11. Reference character $2_2$ in FIG. 2 designates an interior material covering the center pillar 2 facing the compartment, and reference character 18 designates a cover made of resin material covering a connected portion between the shoulder anchor 4 and the support member 17.

Among the pair of rivets 14, 16 coupling the shock absorbing member 13 and anchor frame 11, the rivet 14 having a larger diameter has a sufficient strength and cannot be broken, even if a shock is applied from the webbing 1 through the shoulder anchor 4 to anchor frame 11 upon collision. On the other hand, the rivet 16 has a smaller diameter and its strength is set at a value such that the rivet 16 is broken when a shock of a predetermined value, or more, is applied to anchor frame 11.

Figure 5:
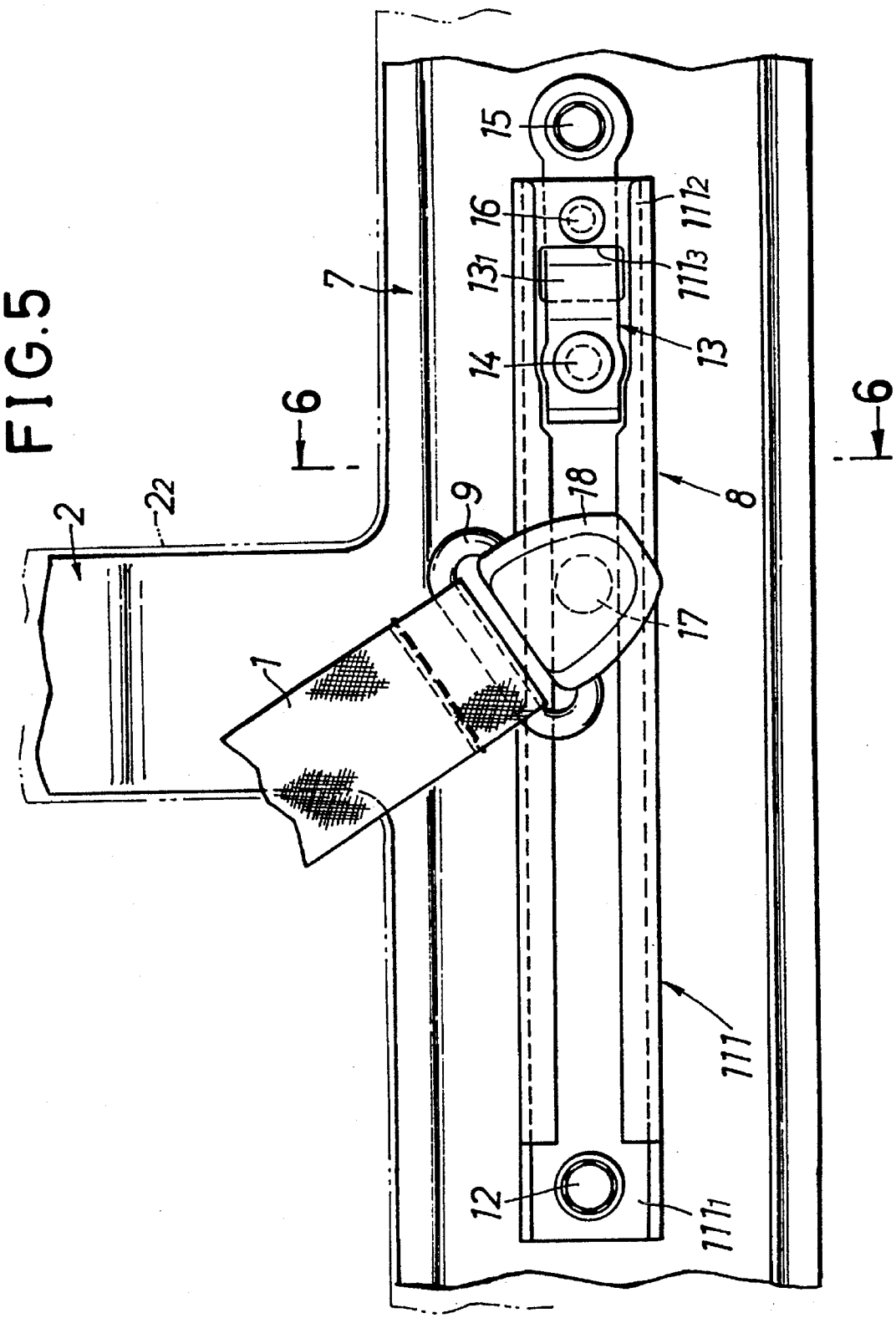
FIG. 5 is an enlarged view of a portion indicated by 5 in FIG. 1.
Figure 6:
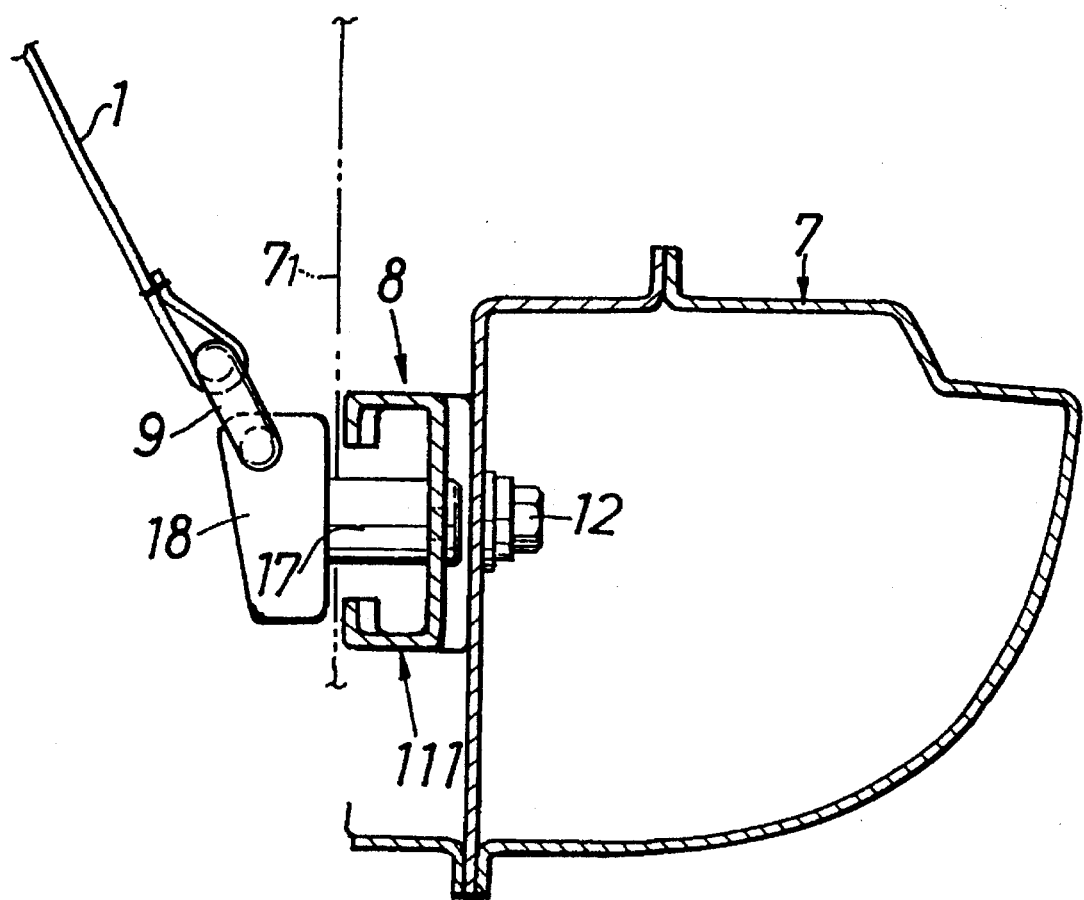
FIG. 6 is a sectional view taken along line 6—6 in FIG. 5.

FIGS. 5 and 6 illustrate the wrap anchor device 8.

The wrap anchor device 8 is mounted on the side sill 7. A wrap anchor frame $11_1$ is mounted such that its fixed wrap anchor frame end $111_1$ is directed to the forward of a vehicle and its free wrap anchor frame end $111_2$ is directed to the rearward of the vehicle. The other end of the webbing 1 is secured to the wrap anchor 9. The structure of the wrap anchor device 8 is the same as that of the shoulder anchor device 3 and hence, the repeated description is omitted.

The operation of the first embodiment of the present invention having the above construction will be described below.

Figure 4:
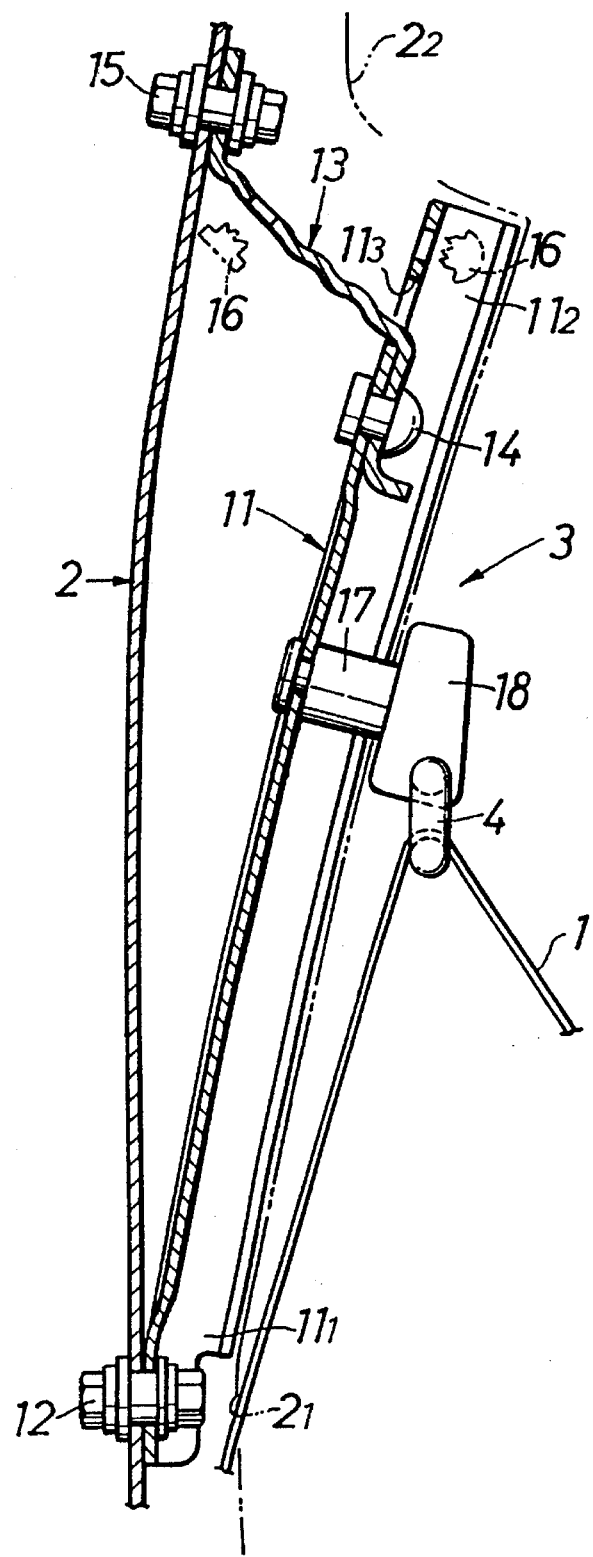
FIG. 4 is a view similar to FIG. 2 for explaining the operation.

An occupant who is about to be thrown out forwardly of the vehicle by an inertia due to a shock by collision of the automobile is restrained on the seat S by a tension of the webbing 1 of the seat belt B. At this time, the tension of the webbing 1 is transmitted from the shoulder anchor 4 through the support member 17 to anchor frame 11, as viewed in FIG. 2. But if the load thereof exceeds a predetermined value, the smaller diameter rivet 16 coupling the free anchor frame end $11_2$ of anchor frame 11 and the shock absorbing member 13 is broken. As a result, anchor frame 11 is curved or bent at a portion in the vicinity of the fixed anchor frame end $11_1$ thereof toward the inside of the compartment, as shown in FIG. 4, and the bent portion $13_1$ of the shock absorbing member 13 connecting the free anchor frame end $11_2$ and the center pillar 2 is plastically deformed and stretched. Thus, the shock transmitted from the webbing 1 to the shoulder anchor 4 is absorbed by the stretching of the shock absorbing member 13, ensuring that the occupant can be restrained softly.

Likewise, the smaller diameter rivet 16 of the wrap anchor device 8 mounted on the side sill 7 is also broken by the load, so that the shock transmitted to the wrap anchor 9 can be absorbed by the stretching of the shock absorbing member 13.

It is possible not only to set the magnitude of the load in the moment of deformation of the shock absorbing member 13 at any value by properly changing the diameter and material of the smaller diameter rivet 16, but also to set the amount of movement of the anchors 4 and 9 resulting from the stretching of the shock absorbing members 13 and the load of such movement at any values by changing the length and strength (i.e., material and thickness) of the shock absorbing member 13. Thus, an effective shock absorbing effect can be exhibited.

Figure 7:
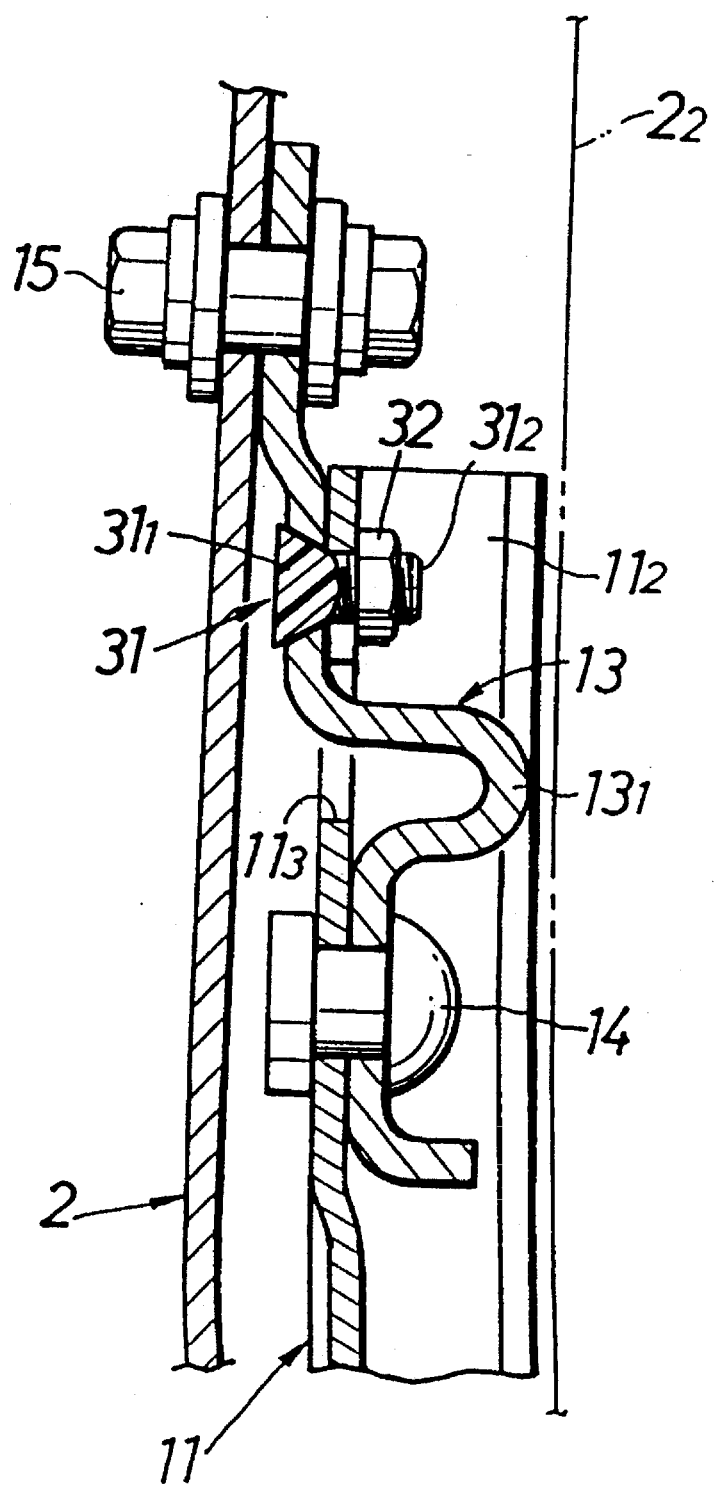
FIG. 7 is similar to the showing in FIG. 2, but shows a second embodiment of the present invention.

FIG. 7 illustrates a second embodiment of the present invention.

In this embodiment, a bolt 31 made of synthetic resin material is employed as a coupling member. The bolt 31 has a tapered head $31_1$ locked to the shock absorbing member 13, and a leg $31_2$ fixed to an inner surface of anchor frame 11 by a nut 32. According to this second embodiment, the head 31₁ of the bolt 31 is deformed by a load applied to anchor frame 11, thereby causing anchor frame 11 and the shock absorbing member 13 to be separated from each other.

Figure 8:
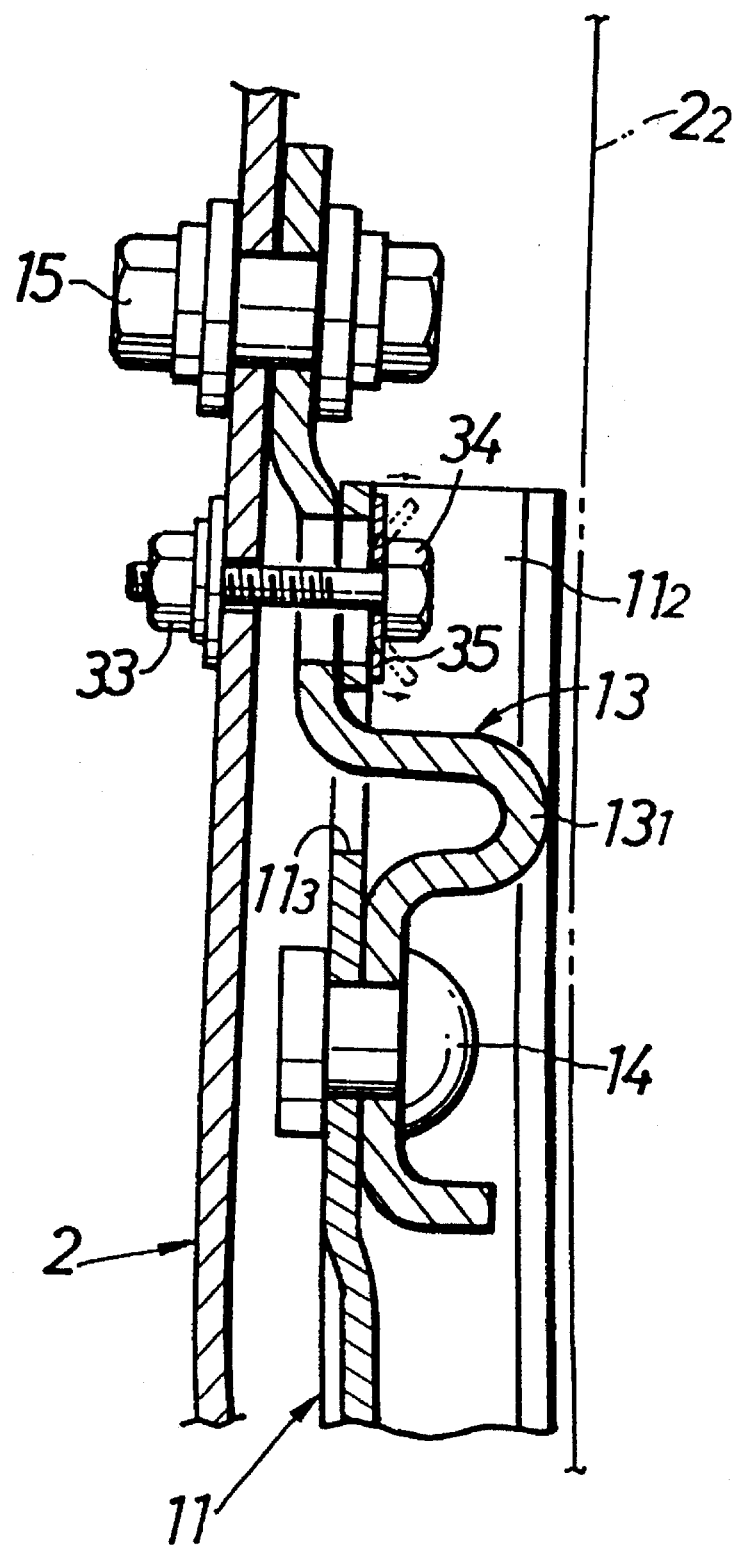
FIG. 8 is similar to the showing in FIGS. 2 and 7, but shows a third embodiment of the present invention.

FIG. 8 illustrates a third embodiment of the present invention.

Figure 9:
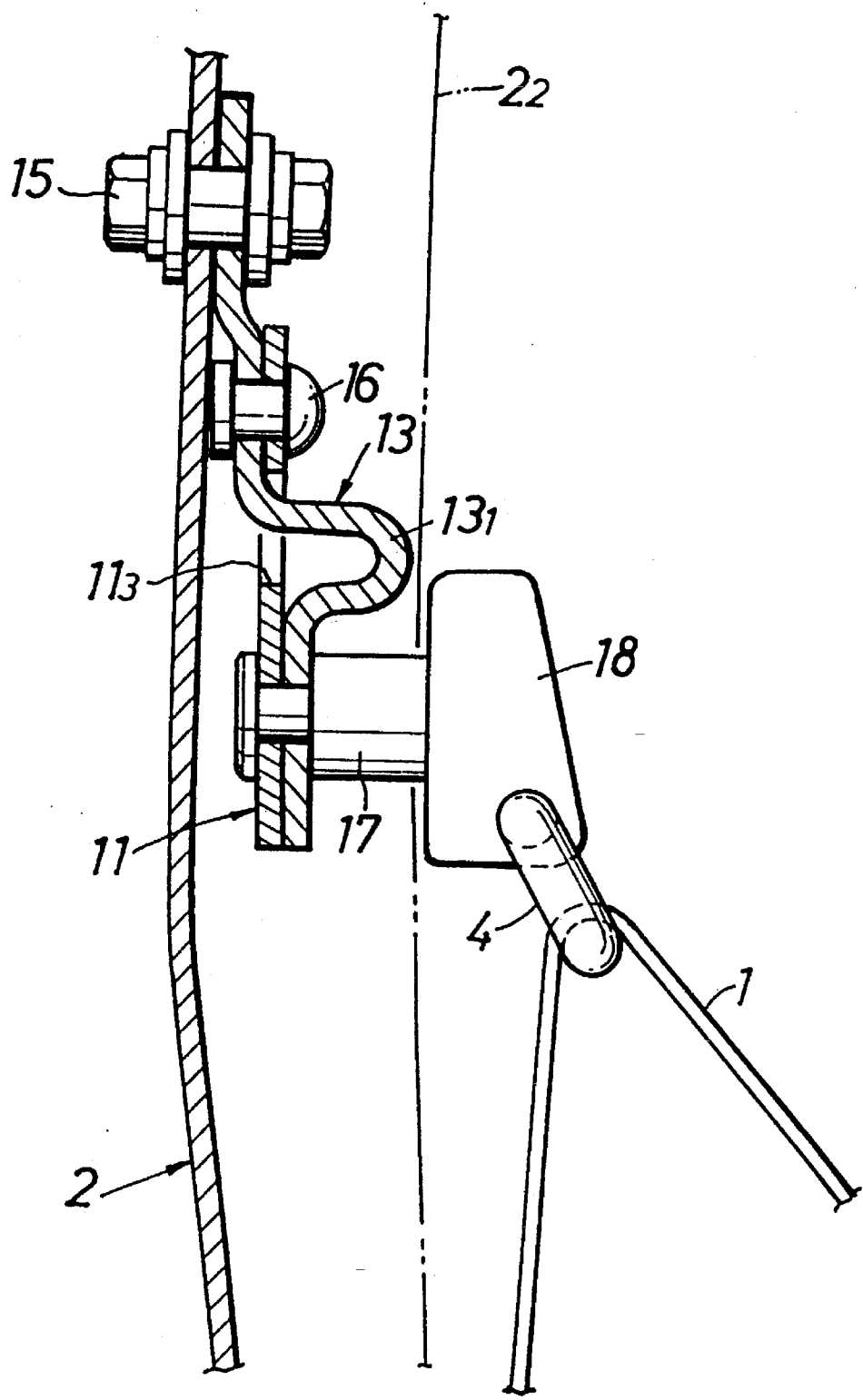
FIG. 9 is similar to the showings in FIGS. 2, 7 and 8, but shows a fourth embodiment of the present invention.

In this embodiment, a bolt 34 locked to the center pillar 2 by a nut 33 is passed through the shock absorbing member 13 and anchor frame 11, and a washer 35 as a coupling member is interposed between a head of the bolt 34 and anchor frame 11. According to this embodiment, the washer 35 is deformed, as shown by a dashed line, by a load applied to anchor frame 11, thereby causing anchor frame 11 and the shock absorbing member 13 to be separated from each other, FIG. 9 illustrates a fourth embodiment of the present invention.

Anchor frame 11 in this embodiment is not fixed to the center pillar 2 but is coupled only to the shock absorbing member 13 by the support member 17 of the shoulder anchor 4. In this embodiment, anchor frame 11 is supported in a floated manner. Therefore, all the tension of the webbing 1 can be applied to anchor frame 11 to further properly break the rivet 16.

Figure 10:
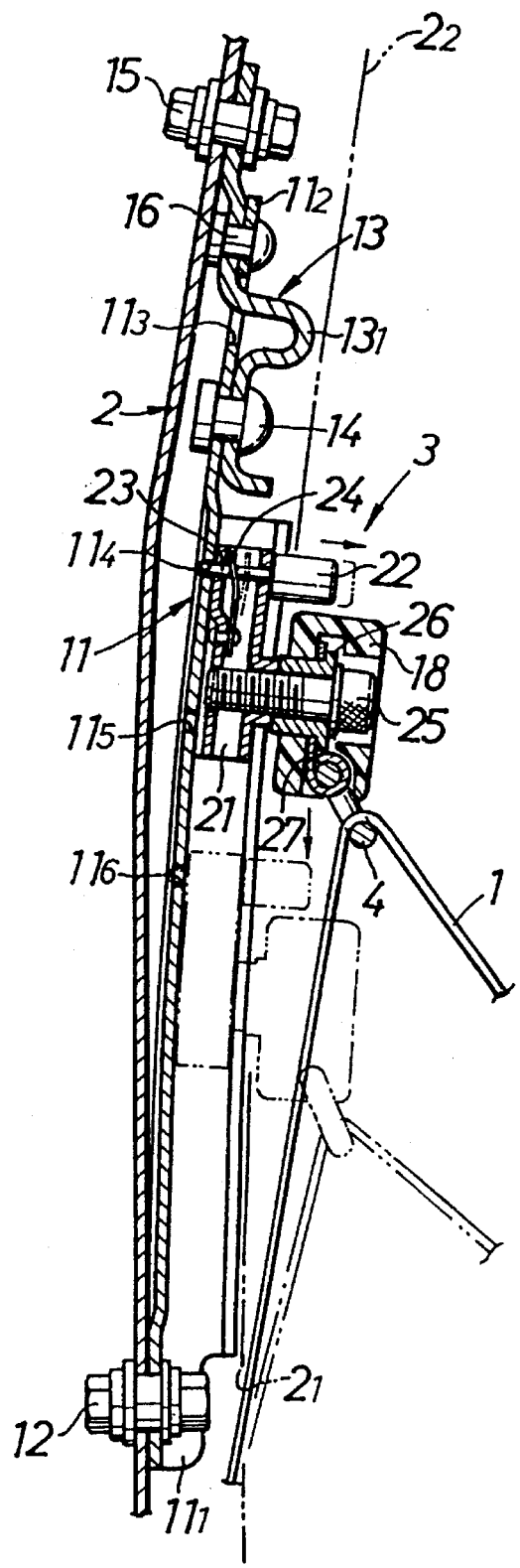
FIG. 10 is similar to the showings in FIGS. 2, 7, 8 and 9, but shows a fifth embodiment of the present invention.

FIG. 10 illustrates a fifth embodiment of the present invention.

The shoulder anchor device 3 in this embodiment is arranged so that the position of the shoulder anchor 4 thereof can be adjusted vertically along anchor frame 11. More specifically, a pin 23 having a knob 22 is mounted in a slider 21 which is slidably received in anchor frame 11. The pin 23 is biased by a leaf spring 24 to selectively engage any of three holds $11_4$ to $11_6$ provided in anchor frame 11. A collar 26, secured to the slider 21 by a bolt 25, and the shoulder anchor 4 are coupled to each other by a connecting member 27, and their peripheries are covered with a cover 18. The remaining construction in this embodiment is the same as in the first embodiment.

Thus, the position of the shoulder anchor 4 can be vertically adjusted, along with the slider 21, by pulling the knob 22 to withdraw the pin 23, for example, from the hole $11_4$ and then, allowing the slider 21 to slide to a predetermined position to bring the pin 23 into engagement, for example, in the hole $11_6$.

Even with this fifth embodiment, the same function and effect as in the first embodiment can be exhibited.

Figure 11:
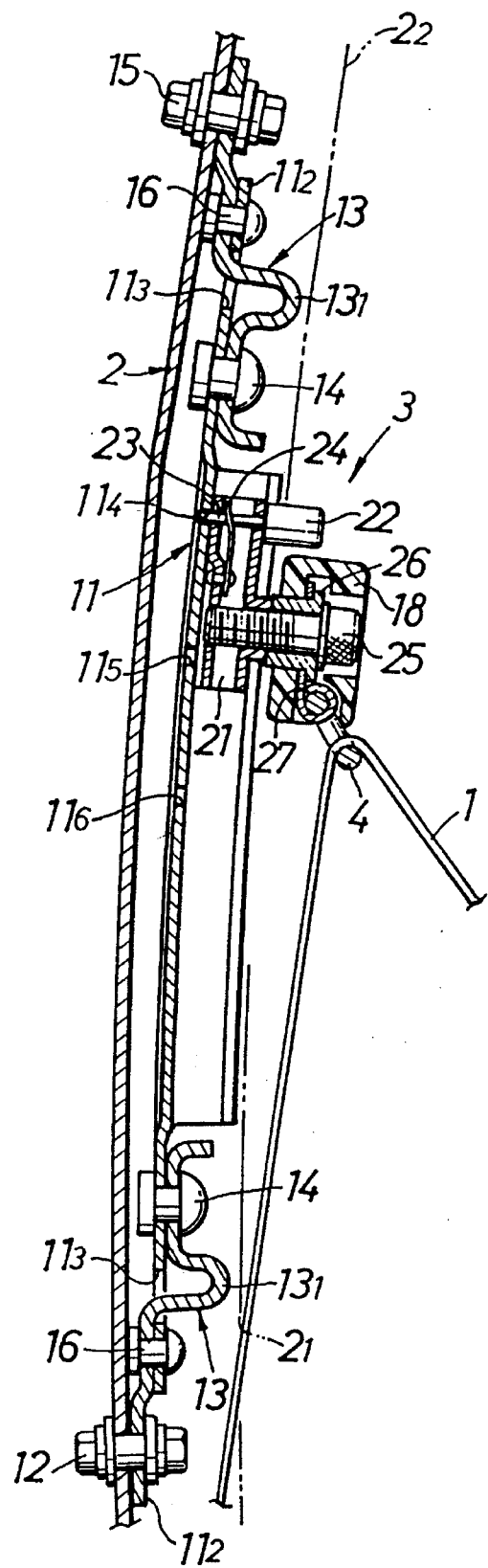
FIG. 11 is similar to the showings in FIGS. 2, 7, 8, 9 and 10, but shows a sixth embodiment of the present invention.

FIG. 11 illustrates a sixth embodiment of the present invention.

In this embodiment, either upper and lower ends of anchor frame 11 are free opposite ends $11_2$, at which the shock absorbing members 13, having the same construction, are mounted, respectively. According to this embodiment, the shock absorbing effect can be further enhanced by operation of one of the shock absorbing members 13 according to the vertical position of the shoulder anchor 4, when the shock load is smaller, and by operation of both the shocks absorbing members 13, when the shock load is larger.

Although the embodiments of the present invention have been described in detail, it will be understood that the present invention is not limited thereto, and various modifications in design can be made without departing from the spirit and scope of the invention defined in claims.

For example, although the shoulder anchor device 3 and the wrap anchor device 8 have been provided in the first embodiment, a sufficient shock absorbing effect can be exhibited by providing only one of the anchor devices 3 and 8. If both the anchor devices 3 and 8 are provided, it is desirable that the coupling member for the wrap anchor device 8, FIGS. 5 and 6, is broken earlier than that for the shoulder anchor device 3, through the present invention is not limited thereto. Further, the coupling member is not limited to those in the embodiments, and any coupling member may be used, if it is capable of coupling the frame and the shock absorbing member 13 and being broken or deformed by a load.

What is claimed is:

1. An anchor device for a seat belt for connecting a webbing for restraining an occupant to a seat of a vehicle body so that a load applied to the webbing is received by the vehicle body, said anchor device comprising, a frame to which an anchor for the webbing is connected, a shock absorbing member secured at one of opposite ends thereof to said frame and at the other of said opposite ends to said vehicle body, said shock absorbing member being deformable by a load above a predetermined load applied by said webbing through said anchor to said frame, and a coupling member for coupling said shock absorbing member intermediate said one end and said other end thereof and closer to said other end thereof to said frame, said coupling member being deformable when a load above a predetermined load is applied to said webbing and is applied to said frame to separate said frame and said shock absorbing member at said coupling member.

2. An anchor device for a seat belt according to claim 1, wherein said shock absorbing member is a curved metal plate connected at said other end thereof to said vehicle body and at said one end thereof to said frame.

3. An anchor device for a seat belt according to claim 2, wherein said coupling member is a rivet which connects said frame with said shock absorbing member which rivet is broken by said load above said predetermined load applied to said frame.

4. An anchor device for a seat belt according to claim 2, wherein said coupling member is an engaging member which engages said frame and said shock absorbing member to each other and which engaging member is deformed by said load above said predetermined load applied to said frame.

5. An anchor device for a seat belt, comprising, a webbing for restraining an occupant to a seat fixed to a vehicle body, a frame to which said webbing is connected, a coupling means for restraining a relative position of said frame with respect to said vehicle body and for permitting relative movement of the frame relative to said vehicle body in response to a load above a predetermined load applied to the frame, and a shock absorbing means interposed between said frame and said vehicle body for resisting force in a direction to inhibit said relative movement, wherein said coupling means is coupled between said frame and said shock absorbing means.

6. An anchor device for a seat belt according to claim 5, wherein said frame is coupled to said vehicle body by a pair of shock absorbing means.

7. An anchor device for a seat belt, comprising a webbing for restraining an occupant to a seat fixed to a vehicle body, an anchor for locking said webbing, a one piece shock absorbing member connecting said anchor to said vehicle body and deformable by a load above a predetermined load applied by said webbing to said anchor so as to permit a relative movement of said anchor with respect to said vehicle body, a frame which resists a deformation of said shock absorbing member, and a coupling member coupled between said frame and said shock absorbing member for releasing a resistance of said frame when said anchor receives said load above said predetermined load.

* * * * *